United States Patent
Campbell et al.

(10) Patent No.: US 11,942,661 B2
(45) Date of Patent: Mar. 26, 2024

(54) BATTERY CELLS WITH TABS AT RIGHT ANGLES

(71) Applicant: Apple Inc., Cupertino, CA (US)

(72) Inventors: Christopher T. Campbell, San Jose, CA (US); Nivay Anandarajah, San Leandro, CA (US); William A. Braff, Palo Alto, CA (US); Oskar Dondelewski, San Jose, CA (US); Russell A. McLellan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 17/448,808

(22) Filed: Sep. 24, 2021

(65) Prior Publication Data

US 2023/0101797 A1    Mar. 30, 2023

(51) Int. Cl.
*H01M 50/531* (2021.01)
*H01M 50/505* (2021.01)
*H01M 50/55* (2021.01)

(52) U.S. Cl.
CPC ....... *H01M 50/531* (2021.01); *H01M 50/505* (2021.01); *H01M 50/55* (2021.01)

(58) Field of Classification Search
CPC ... H01M 50/531; H01M 50/505; H01M 50/55
See application file for complete search history.

(56) References Cited

U.S. PATENT DOCUMENTS

| | | | |
|---|---|---|---|
| 8,263,255 B2* | 9/2012 | Byun | H01M 50/562 |
| | | | 429/178 |
| 9,136,556 B2* | 9/2015 | Cho | H01M 10/0436 |
| 10,230,092 B2* | 3/2019 | Koo | H01M 50/531 |
| 2010/0190056 A1 | 7/2010 | Turner et al. | |
| 2010/0203380 A1 | 8/2010 | Ophelan et al. | |

(Continued)

FOREIGN PATENT DOCUMENTS

| JP | 6505859 B2 * | 4/2019 | ........ H01M 10/0566 |
|---|---|---|---|
| WO | 2011122868 A2 | 10/2011 | |

OTHER PUBLICATIONS

Machine translation of WO 2011122868 A2, 2011, 44 pages.

(Continued)

*Primary Examiner* — Brian R Ohara
(74) *Attorney, Agent, or Firm* — Kilpatrick Townsend & Stockton LLP

(57) ABSTRACT

Batteries according to embodiments of the present technology may include a housing including a first terminal disposed on a first side of the housing and a second terminal disposed on the first side of the housing. The batteries may include an electrode stack positioned within the housing. The electrode stack may include an anode current collector. The anode current collector may define an anode tab along a second side of the anode current collector, and be electrically coupled with the first terminal. The electrode stack may include a cathode current collector. The cathode current collector may define a cathode tab along a second side of the cathode current collector. The cathode tab and anode tab may extend in a direction normal to a direction facing the first side of the housing. The cathode tab may be electrically coupled with the second terminal.

20 Claims, 3 Drawing Sheets

(56) References Cited

U.S. PATENT DOCUMENTS

| | | | |
|---|---|---|---|
| 2014/0272547 A1* | 9/2014 | Ramasubramanian | ............... H01M 50/446 429/246 |
| 2020/0052265 A1 | 2/2020 | Wakimoto et al. | |
| 2021/0175567 A1 | 6/2021 | Kim et al. | |
| 2021/0234202 A1* | 7/2021 | Kim | ............ H01M 50/105 |
| 2021/0257622 A1 | 8/2021 | Tanaami et al. | |
| 2021/0280950 A1 | 9/2021 | Dorresteyn | |
| 2022/0111758 A1 | 4/2022 | Ijaz et al. | |
| 2022/0111759 A1 | 4/2022 | Ijaz | |
| 2022/0115897 A1 | 4/2022 | Ijaz | |
| 2022/0140452 A1* | 5/2022 | Wakimoto | ............ H01M 50/35 429/163 |
| 2023/0026549 A1 | 1/2023 | Ijaz et al. | |

OTHER PUBLICATIONS

U.S. Appl. No. 17/448,793, Non-Final Office Action, dated Feb. 16, 2023, 16 pages.
U.S. Appl. No. 17/448,799, Non-Final Office Action, dated Mar. 17, 2023, 24 pages.
International Patent Application No. PCT/U32022I042874, International Search Report and Written Opinion, dated Jan. 10, 2023, 14 pages

* cited by examiner

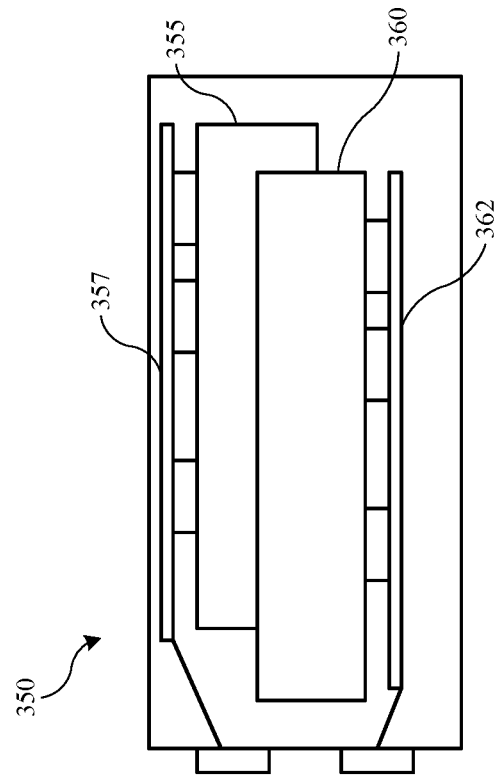
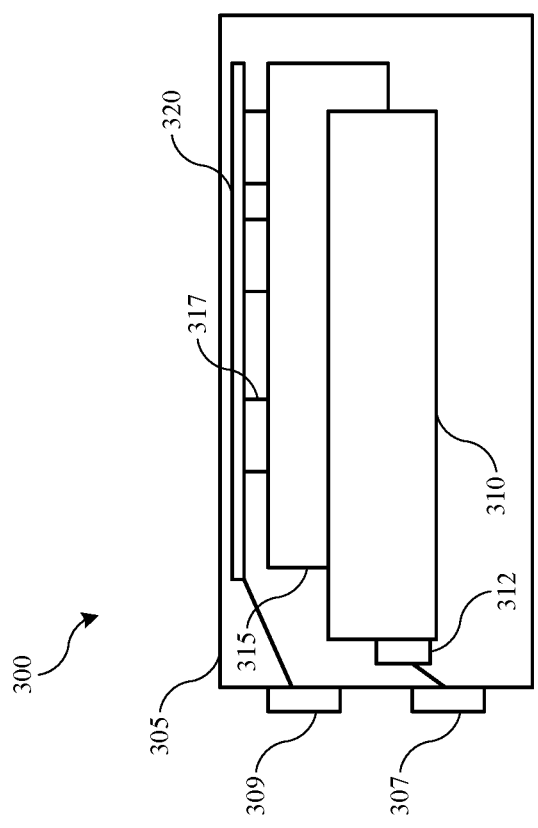
FIG. 3A
FIG. 3B

BATTERY CELLS WITH TABS AT RIGHT ANGLES

CROSS-REFERENCES TO RELATED APPLICATIONS

The present technology is related to the following applications, U.S. patent application Ser. No. 17/448,793, filed Sep. 24, 2021, entitled "BATTERY CELLS WITH TABS AT RIGHT ANGLES" and U.S. patent application Ser. No. 17/448,799, filed Sep. 24, 2021, entitled "BATTERY CELLS WITH TABS AT RIGHT ANGLES". Each of these applications is hereby incorporated by reference in their entirety for all purposes.

TECHNICAL FIELD

The present technology relates to batteries. More specifically, the present technology relates to batteries where the current collector tabs may be formed at right angles to one another.

BACKGROUND

Batteries are used in many devices. As devices in which batteries are housed reduce in size and require increased energy density, the available space for battery cells and associated system materials may challenge battery operation.

SUMMARY

Batteries according to embodiments of the present technology may include a housing including a first terminal disposed on a first side of the housing and a second terminal disposed on the first side of the housing. The batteries may include an electrode stack positioned within the housing. The electrode stack may include an anode current collector. The anode current collector may be characterized by a first side facing the first side of the housing. The anode current collector may define an anode tab along a second side of the anode current collector. The anode tab may extend from the anode current collector in a direction normal to a direction facing the first side of the housing. The anode tab may be electrically coupled with the first terminal. The electrode stack may include a cathode current collector. The cathode current collector may be characterized by a first side facing the first side of the housing. The cathode current collector may define a cathode tab along a second side of the cathode current collector. The cathode tab may extend from the cathode current collector in a direction normal to a direction facing the first side of the housing. The cathode tab may be electrically coupled with the second terminal.

In some embodiments, the cathode current collector may define a plurality of cathode tabs extending from the second side of the cathode current collector. The anode current collector may define a plurality of anode tabs extending from the second side of the anode current collector. The plurality of cathode tabs may be distributed along the second side of the cathode current collector with a non-uniform spacing between each cathode tab of the plurality of cathode tabs. The batteries may include a first busbar coupled with each cathode tab of the plurality of cathode tabs. The first busbar may be electrically coupled with the housing. The batteries may include a second busbar coupled with each anode tab of the plurality of anode tabs. The second busbar may be electrically isolated from the housing. The first busbar may be coupled with a cap disposed on a second side of the housing opposite the first side of the housing. The first terminal may be electrically isolated from the housing. The housing and second terminal may be maintained at cathode potential.

The anode current collector may include a plurality of anode current collectors. Each anode current collector of the plurality of anode current collectors may define an anode tab extending from a second side of the anode current collector. Each anode tab from the plurality of anode current collectors may be coupled together. The cathode current collector may include a plurality of cathode current collectors. Each cathode current collector of the plurality of cathode current collectors may define a cathode tab extending from a second side of the cathode current collector. Each cathode tab from the plurality of cathode current collectors may be coupled together. The batteries may include a separator. The separator may be a continuous separator folded between each current collector of the plurality of anode current collectors and the plurality of cathode current collectors. The separator may wrap about a third side opposite the second side of each anode current collector. The separator may wrap about a third side opposite a second side of each cathode current collector. The second side of the anode current collector may face in an opposite direction as the second side of the cathode current collector. The housing may be or include aluminum.

Some embodiments of the present technology may encompass batteries. The batteries may include a housing including a first terminal disposed on a first side of the housing and a second terminal disposed on the first side of the housing. The housing may be characterized by a second side opposite the first side, a third side extending between the first side and the second side, and a fourth side opposite the third side. The batteries may include an electrode stack positioned within the housing. The electrode stack may include a first current collector characterized by a first side facing the first side of the housing, a second side opposite the first side, a third side extending between the first side and the second side, and a fourth side opposite the third side. The first current collector may define a first current collector tab along the third side of the first current collector. The first current collector tab may extend towards the third side of the housing. The first current collector tab may be electrically coupled with the first terminal. The electrode stack may include a second current collector characterized by a first side facing the first side of the housing, a second side opposite the first side, a third side extending between the first side and the second side, and a fourth side opposite the third side. The second current collector may define a second current collector tab along the fourth side of the second current collector. The second current collector tab may be electrically coupled with the second terminal.

In some embodiments, the first current collector may include an anode current collector, and the second current collector may include a cathode current collector. The second current collector may define a plurality of second current collector tabs extending from the second side of the second current collector. The batteries may include a busbar coupled with each second current collector tab of the plurality of second current collector tabs. The busbar may be electrically coupled with the housing. The busbar may be electrically coupled with the housing at the second side of the housing. The batteries may include a separator. The separator may be a continuous separator extending between the first current collector and the second current collector. The separator may be folded over the fourth side of the first current collector and folded over the third side of the second current collector. The first terminal may be electrically isolated from the housing. The housing and second terminal may be maintained at an electrical potential of the second current collector.

Some embodiments of the present technology may encompass batteries. The batteries may include a housing including a first terminal disposed on a first side of the housing and a second terminal disposed on the first side of the housing. The first terminal may be electrically isolated from the housing. The batteries may include an electrode stack positioned within the housing. The electrode stack may include an anode current collector characterized by a first side facing the first side of the housing, a second side opposite the first side, and a third side extending between the first side and the second side. The anode current collector may define an anode tab along the third side of the anode current collector. The anode tab may be electrically coupled with the first terminal. The electrode stack may include a cathode current collector characterized by a first side facing the first side of the housing, a second side opposite the first side, and a third side extending between the first side and the second side. The cathode current collector may define a cathode tab along the third side of the cathode current collector. The cathode tab may be electrically coupled with the housing.

Such technology may provide numerous benefits over conventional technology. For example, the present batteries may afford limited increases in resistance while providing increased battery energy density. Additionally, the battery components may be coupled together to accommodate a range of configurations and sizes, while controlling mass and volume increases of the battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIGS. 3A-3B show schematic views of batteries encompassed by some embodiments of the present technology.

Figure 1:
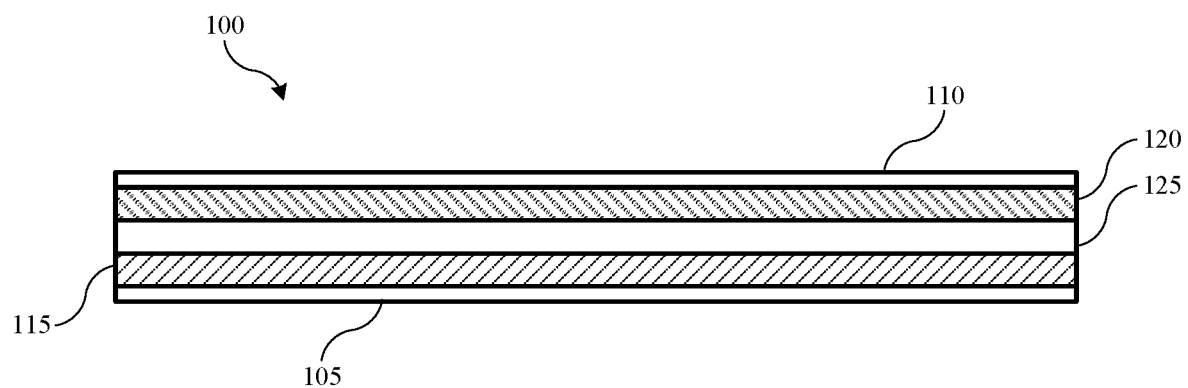
FIG. 1 shows a schematic cross-sectional view of a battery cell according to some embodiments of the present technology.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery system components may be constrained. These constraints may include restrictions in available volume as well as the geometry of such a volume. Additionally, for devices requiring increased energy availability between charging or replacement, batteries may be increasing in one or more dimensions, which may cause resistance increases across components.

For example, batteries for large devices may be characterized by an extended length or depth, which may extend for a meter or more in length. Additionally, the number of battery cells within the housing of the battery may be increased, which may cause space constraints. For example, when multiple battery cells are incorporated in a housing, the housing may still include terminals at the same end of the battery. Many battery configurations include tabs extending from each current collector, which may be joined together, and then connected with the battery terminals, where the joined anode tabs may be connected with an anode terminal, and the joined cathode tabs may be connected with the cathode terminal. However, as the number of battery cells within the housing volume increases, the headspace may not be sufficient to accommodate all the tabs and connections at the same end. Conventional technologies have been unable to overcome these issues.

The present technology may overcome these challenges by adjusting the tab locations on one of the current collectors or current collector sets. While one set of collectors may include tabs extending from a surface in a first direction, the other set of collectors may include tabs extending from a surface substantially perpendicular to the first direction. This may not only address issues with space constraints, but may also provide improvements in resistance across the cell components, which can improve the efficiency of the battery.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, mobile electronic devices, computers or computer systems, appliances, heavy machinery, transportation equipment including automobiles, water-faring vessels, air travel equipment, and space travel equipment, as well as other devices that may benefit from the use of the variously described battery technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through the structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may include charging and discharging capabilities similarly may be encompassed by the present technology.

Figure 2:
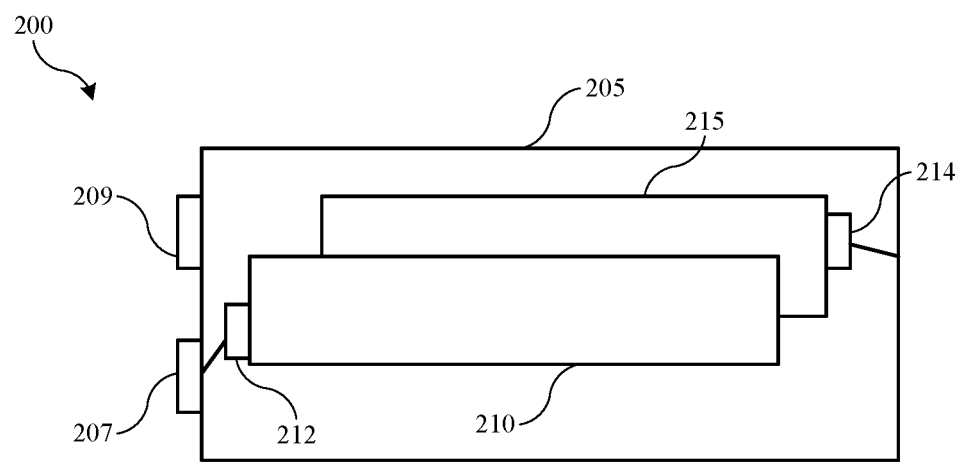
FIG. 2 shows a schematic view of a battery according to some embodiments of the present technology.

FIG. 2 shows a schematic view of a battery 200 according to some embodiments of the present technology. Battery 200 may include any aspect of battery cell 100, and may include any number of battery cells, which may be stacked or incorporated in any number of ways. Battery 200 may include a housing 205, as well as one or more battery cells within the housing. The battery cells may include any feature, component, or characteristic of battery cells described previously, and may include multiple battery cells incorporated as an electrode stack within the housing. Although the electrode stack may include any number of battery cells or battery cell components, in some embodiments the electrode stack may include at least one anode electrode, and at least one cathode electrode, although the stack may include tens or hundreds of electrodes in embodiments according to the present technology.

As explained above, each electrode may include a current collector, which may provide a path for current to flow to or from the electrode. For ease of explanation, the remaining figures will show the current collectors, but one of skill will readily appreciate that active materials, separators, electrolytes, and any other additive or material may be included as well. The battery 200 is illustrated showing an anode current collector 210 and a cathode current collector 215, although the figure and any other figure may also encompass the opposite configuration where the cathode current collector is coupled at the terminals, and the anode current collector is coupled with the housing. The current collectors may each include a tab, which may be a region of the current collector where active material may not be disposed. When multiple battery cells are included, the current collectors at similar potential may be welded together, and then electrically connected with the terminals.

Housing 205 may include a first terminal 207 and a second terminal 209, which may both be disposed on a first surface of the housing. As explained above, some battery configurations where both terminals are included on the same end of the housing may have challenges with having all current collector tabs at a similar position within the housing. Accordingly, battery 200 may include tabs on the current collectors extending from opposite ends. For example, anode current collector 210 may include an electrode tab 212 extending from a first side of the current collector, such as a side proximate or facing the first side of the housing. Additionally, cathode current collector 215 may include an electrode tab 214 extending from a second side of the current collector, such as a side opposite the first side. It is to be understood that throughout the remaining disclosure, any side of a housing or a current collector may be termed first, second, third, or fourth, and it is to be understood that the sides of each component may be in the same direction or different directions in embodiments encompassed by the present technology. Additionally, the couplings between electrode tabs and terminals or the housing may be formed by any number of materials. For example, a direct welding or coupling may be formed between the tab and the terminal, or an electrical leg may extend between the components.

Because the cathode current collectors may include tabs facing the opposite direction of the terminals, the tabs may be electrically connected with the housing itself, which may operate as a channel to deliver current between the second electrode and the second terminal 209. In some embodiments the housing 205 of the battery may be conductive and may be at the potential of one of the electrodes, such as the cathode, although the housing may also be maintained at anode potential. The second electrode terminal 209 may represent the electrode terminal of the potential at which the housing is maintained. Accordingly, the terminal may be a contact, tab, or access of the housing. The first electrode terminal 207, however, may be at the opposite potential of the housing and/or the second electrode terminal 209, and may be maintained or electrically isolated from the rest of the housing. Accordingly, by connecting the cathode current collector tab to the housing, the tab may be electrically coupled with the second terminal 209.

However, by coupling the cathode tabs to the housing, current delivered along the cathode current collectors may extend the length of the current collector in one direction, and then along the length of the housing back to the terminal. For batteries characterized by longer dimensions, such as tens of centimeters or meters in length, the added travel may increase resistance, and reduce efficiency of operation, which may translate to reduced performance of the battery. Accordingly, the present technology may utilize additional configurations that may overcome or limit the resistance associated with one current collector, or current collector set, over the other.

Turning to FIGS. 3A-3B are shown schematic views of batteries encompassed by some embodiments of the present technology. The illustrated configurations may include any component, aspect, or feature discussed above, and may include any number of cells in an electrode stack in some embodiments. For example, as illustrated in FIG. 3A, battery 300 may include a housing 305, which may include a first terminal 307 and a second terminal 309 extending from a first surface of the housing. Additionally, the battery may include an anode current collector 310 and a cathode current collector 315. The anode current collector may define a tab 312 extending from a first surface of the anode current collector, such as towards the first surface of the housing. The anode tab may be electrically coupled with the first terminal.

Cathode current collector 315 may define one or more tabs 317, which may not extend from the first surface in some embodiments. While cathode current collector 315 may be characterized by a first surface facing the first surface of the housing, as well as a second surface opposite the first surface, cathode current collector 315 may have tabs extending from a third surface extending between the first surface and the second surface as illustrated. Accordingly, the tabs on the cathode current collector may extend in a direction substantially perpendicular to a direction in which the tabs on the anode current collector extend. By substantially, it is to be understood that based on manufacturing tolerances, as well as physical movement within the housing, the tabs may not be exactly 90° from one another. Each cathode current collector may also include more than one tab extending from the current collector. A length of each current collector, such as along the third side, may be greater than the width, such as greater than or about two times the width, greater than or about five times the width, greater than or about ten times the width, greater than or about twenty times the width, greater than or about fifty times the width, greater than or about one hundred times the width, or more. Accordingly, by including more than one tab, a more uniform current density may be distributed from the current collector. Although the tabs 317 may be uniformly spaced along the current collector, in some embodiments the spacing may be non-uniform, which may ensure that current is more uniformly distributed from areas further from the housing terminal.

In some embodiments, the cathode current collector tabs may be electrically coupled with a busbar 320, which may extend along the housing. The busbar may be made of the same or different material as the current collector, and may be characterized by a thickness that may more readily distribute current. The busbar may be electrically coupled with the second terminal 309. By including a busbar and multiple current collector tabs, resistance may be greatly reduced from a configuration in which all current must travel the length of the current collector, and then back along an equivalent length of the housing. When multiple current collectors, such as with multiple cells, are incorporated in such a configuration, each current collector may include multiple tabs, which may be joined, welded, bonded, or otherwise coupled together at each location before being connected with the busbar.

FIG. 3B illustrates an additional embodiment in which both the anode current collectors and the cathode current collectors may be connected with busbars. For example, battery 350 as illustrated may include any component as previously described, as well as any feature or characteristic of batteries, or electrode stacks, as discussed above. Cathode current collector 355, or any number of cathode current collectors, may include a number of tabs, which may be coupled with a first busbar 357 as previously described. Additionally, anode current collector 360 may include a similar configuration. For example, the anode current collector may include any number of tabs, which may be in the same or a different orientation or location as the cathode current collector tabs. Because the components may be made of a different material, which may cause a different current distribution or resistance, the number or arrangement of tabs on the anode current collectors may differ from that of the cathode current collectors. The tabs from the anode current collectors may be coupled with a busbar 362, which may be electrically coupled with the first terminal. Such a configuration may benefit batteries characterized by increased lengths as noted above.

Figure 4:
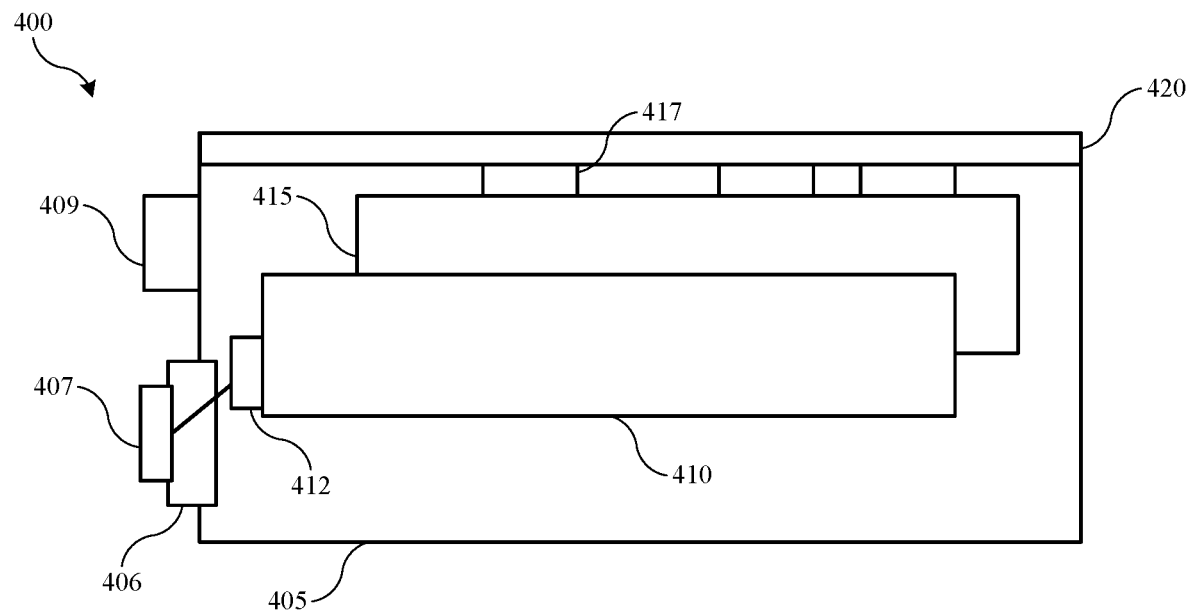
FIG. 4 shows a schematic view of a battery according to some embodiments of the present technology.

In some embodiments, anode current collectors may be formed of a material characterized by lower resistance than a material used for cathode current collectors, as previously described. Accordingly, the resistance gains of including the busbar for the anode may not be greater than a potential loss of volume due to the incorporation of the busbar. Additionally, the cathode current collector busbar as illustrated in FIGS. 3A and 3B may still include a design in which current travels the entire length of the busbar before being distributed to the housing terminal. FIG. 4 shows a schematic view of a battery 400 according to some embodiments of the present technology, and which may provide additional benefits over other designs.

Battery 400 may include any component, feature, or characteristic of batteries discussed throughout the present disclosure, including housings, electrode stacks, current collectors, or any other feature or component. It is to be understood that any concept or feature discussed previously may be included in battery 400 in some embodiments of the present technology. For example, battery 400 may include a housing 405, in which a battery cell or a number of battery cells as an electrode stack may be included. Housing 405 may include a first terminal 407 disposed on a first side of the housing, and may include a second terminal 409 disposed on the first side of the housing. In some embodiments, the housing 405 may be maintained at the potential of one of the electrodes, such as cathode potential, and thus, first terminal 407 may be electrically isolated from the housing as illustrated. To isolate the first electrode terminal 407 from the rest of the housing, a spacer 406 may extend circumferentially about the first electrode terminal through the housing of battery, including along the first surface of housing 405.

An electrode stack may be disposed within the housing, and may include any number of components or battery cells in embodiments of the present technology. Included with the electrode stack may be an anode current collector 410, which may define an anode tab 412 along a first side of the anode current collector, which may face and extend towards the first side of the housing, and which may be electrically coupled with the first terminal 407. In some embodiments, each of the housing, anode current collector, and cathode current collector may be characterized by a first side, such as the first side of the housing in which the terminals are positioned. The components may include a second side opposite the first side, a third side extending between the first side and the second side, and a fourth side opposite the third side. In embodiments each side of each component may be the same or different between components. Also, as previously explained, in embodiments in which multiple current collectors are included, the tabs of each anode current collector may be joined as discussed above, and the tabs of each cathode current collector may be joined as discussed above.

The electrode stack may also include a cathode current collector 415, which may define one or more cathode tabs 417 along the third side of the cathode current collector. These tabs may extend in a direction normal to the direction of the anode tab 412 as previously described. Cathode tabs 417 may be characterized by any of the features or characteristics as previously described, such as the number and/or arrangement of tabs across each cathode current collector, and the cathode tabs may be electrically coupled with the second terminal 409. For example, each cathode current collector may define a plurality of cathode tabs extending from the length of the current collector, and which may be distributed in a uniform or non-uniform spacing along each current collector. Additionally, the cathode current collector tabs may be similarly sized or be formed to different sizes in some embodiments. Each cathode current collector tab may be electrically coupled with a busbar 420, which may include any feature or characteristic of busbars discussed above. Additionally, in some embodiments, busbar 420 may be coupled with the housing at one or more locations as illustrated.

For example, in some embodiments busbar 420 may be coupled with housing 405 along the third surface of housing 405 at any number of locations, which may facilitate electrical coupling. Additionally, in some embodiments, busbar 420 may extend to one or both ends of the housing, and may be electrically coupled with one or both of the first side and/or the second side of the housing 405. The electrical coupling may include welding, bonding, or otherwise connecting the components, which may allow the current collectors to transfer current to the busbar, which may transfer current to the housing for distribution to the second terminal. In some embodiments, the busbar and housing may be the same material as the cathode current collectors, and may be any of the materials previously described. By including one or more electrical connections, the resistance for the cathode current collector may be minimized in embodiments of the present technology. This may allow more efficient current transfer along longer current collectors, while minimizing volume use within the housing.

Figure 5:
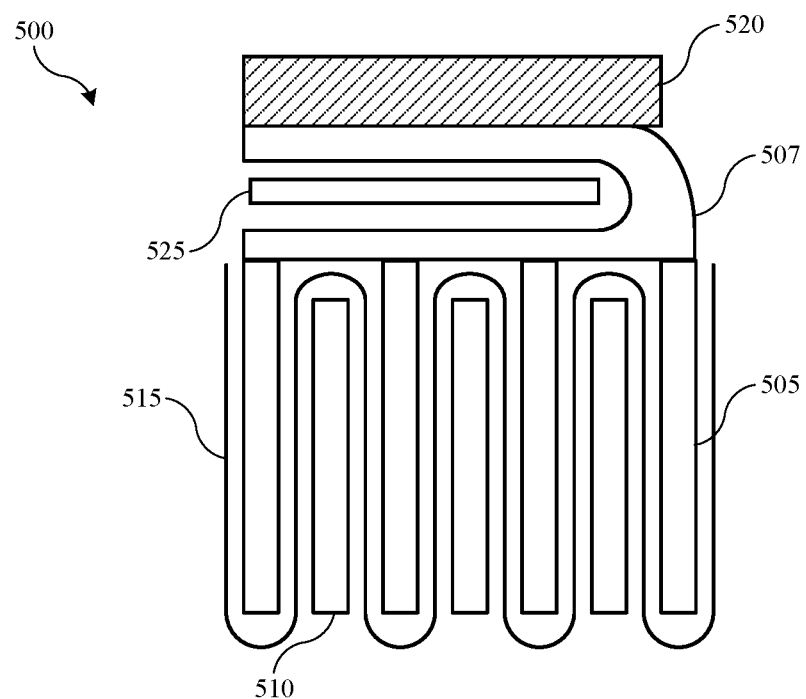
FIG. 5 shows a schematic view of battery components according to some embodiments of the present technology.

FIG. 5 shows a schematic view of battery components 500 according to some embodiments of the present technology, and may illustrate an example of coupling current collectors to a busbar encompassed by the present technology. The components illustrated may be included in any battery as previously described, and may illustrate a configuration of components for any of the batteries discussed above. For example, the figure may show a number of cathode current collectors coupled along the third surface as previously explained. Any number of battery cells may be included in embodiments of the present technology, and FIG. 5 is intended only to show how components may be coupled, regardless of how many specific components are included.

A number of cathode current collectors 505 may extend further in one direction than the anode current collectors 510, which may extend further in a perpendicular direction such as in or out of the page according to this figure. Because the components may extend in different directions, incorporating a separator 515 may be performed to accommodate the extension of each current collector, such as in a first direction, such as from the first side for each anode current collector, and in a second direction, such as from the third side for each cathode current collector. Accordingly, a separator 515, which may be a continuous, wrapped separator in some embodiments, may extend about the fourth side of each cathode current collector, and about the third side of each anode current collector associated with the side of the cathode current collectors from which the tabs extend, and which may be coupled with a busbar. Accordingly, separator 515 may protect the anode current collectors from the coupled cathode current collectors as illustrated.

The cathode current collector tabs 507, may be joined together and bonded or welded into a single conductive component at each tab location, as illustrated. A busbar 520 may be coupled with an end of the current collector tabs at each location, and then folded back to limit the height extension within the housing. In some embodiments, a spacer 525 may be included between the folded portions of the cathode current collector tabs as shown, which may maintain similar spacing across the length of the electrode stack, and which may facilitate contact with the housing at one or more locations. By forming tabs extending in two different directions for current collectors according to embodiments of the present technology, improved operational efficiency may be provided, while limiting resistance across components.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
 a housing comprising a first terminal disposed on a first side of the housing and a second terminal disposed on the first side of the housing; and
 an electrode stack positioned within the housing, the electrode stack comprising:
  an anode current collector, wherein the anode current collector is characterized by a first side facing the first side of the housing, wherein the anode current collector defines an anode tab along a second side of the anode current collector, the anode tab extending from the anode current collector in a direction normal to a direction facing the first side of the housing, and wherein the anode tab is electrically coupled with the first terminal, and
  a cathode current collector, wherein the cathode current collector is characterized by a first side facing the first side of the housing, wherein the cathode current collector defines a cathode tab along a second side of the cathode current collector, the cathode tab extending from the cathode current collector in a direction normal to the direction facing the first side of the housing, and wherein the cathode tab is electrically coupled with the second terminal, wherein:
   the cathode current collector defines a first and second series of cathode tabs distributed along the second side of the cathode current collector;
   the first series of cathode tabs is closer to the first side of the housing than the second series of cathode tabs; and
   a first spacing between each cathode tab of the first series of cathode tabs is greater than a second spacing between each cathode tab of the second series of cathode tabs.

2. The battery of claim 1, wherein the first and second series of cathode tabs are distributed along the second side of the cathode current collector with a non-uniform spacing between each cathode tab of the first and second series of cathode tabs.

3. The battery of claim 1, further comprising:
 a first busbar coupled with each cathode tab of the first and second series of cathode tabs, wherein the first busbar is electrically coupled with the housing, and
 a second busbar coupled with each anode tab of a plurality of anode tabs distributed along the first side of the anode current collector, wherein the second busbar is electrically isolated from the housing.

4. The battery of claim 3, wherein the first busbar is coupled with a cap disposed on a second side of the housing opposite the first side of the housing.

5. The battery of claim 1, wherein the first terminal is electrically isolated from the housing, and wherein the housing and second terminal are maintained at cathode potential.

6. The battery of claim 1, wherein the anode current collector comprises a plurality of anode current collectors, each anode current collector of the plurality of anode current collectors defining a second anode tab extending from a second side of the anode current collector, and wherein each second anode tab from the plurality of anode current collectors is coupled together.

7. The battery of claim 6, wherein the cathode current collector comprises a plurality of cathode current collectors, each cathode current collector of the plurality of cathode current collectors defining a second cathode tab extending from a second side of the cathode current collector, and wherein each second cathode tab from the plurality of cathode current collectors is coupled together.

8. The battery of claim 7, further comprising:
 a separator, wherein the separator is a continuous separator folded between each current collector of the plurality of anode current collectors and the plurality of cathode current collectors.

9. The battery of claim 8, wherein the separator wraps about a third side opposite the second side of each anode current collector of the plurality of anode current collectors, and wherein the separator wraps about a third side opposite a second side of each cathode current collector of the plurality of cathode current collectors.

10. The battery of claim 1, wherein the second side of the anode current collector faces in an opposite direction as the second side of the cathode current collector.

11. The battery of claim 10, wherein the housing comprises aluminum.

12. A battery comprising:
a housing comprising a first terminal disposed on a first side of the housing and a second terminal disposed on the first side of the housing, wherein the housing is characterized by a second side opposite the first side, a third side extending between the first side and the second side, and a fourth side opposite the third side; and
an electrode stack positioned within the housing, the electrode stack comprising:
a first current collector characterized by a first side facing the first side of the housing, a second side opposite the first side, a third side extending between the first side and the second side, and a fourth side opposite the third side, wherein the first current collector defines a first current collector tab along the third side of the first current collector, the first current collector tab extending towards the third side of the housing, wherein the first current collector tab is electrically coupled with the first terminal, and
a second current collector characterized by a first side facing the first side of the housing, a second side opposite the first side, a third side extending between the first side and the second side, and a fourth side opposite the third side, wherein the second current collector defines a second current collector tab along the fourth side of the second current collector, wherein the second current collector tab is electrically coupled with the second terminal, wherein:
the second current collector defines a first and second series of second current collector tabs distributed along the fourth side of the side current collector;
the first series of second current collector tabs is closer to the first side of the housing than the second series of second current collector tabs; and
a first spacing between each second current collector tab of the first series of second current collector tabs is greater than a second spacing between each second current collector tab of the second series of second current collector tabs.

13. The battery of claim 12, wherein the first current collector comprises an anode current collector, and wherein the second current collector comprises a cathode current collector.

14. The battery of claim 12, further comprising:
a busbar coupled with each second current collector tab of the first and second series of second current collector tabs, wherein the busbar is electrically coupled with the housing.

15. The battery of claim 14, wherein the busbar is electrically coupled with the housing at the second side of the housing.

16. The battery of claim 12, further comprising:
a separator, wherein the separator is a continuous separator extending between the first current collector and the second current collector, wherein the separator is folded over the fourth side of the first current collector and folded over the third side of the second current collector.

17. The battery of claim 12, wherein the first terminal is electrically isolated from the housing, and wherein the housing and second terminal are maintained at an electrical potential of the second current collector.

18. A battery comprising:
a housing comprising a first terminal disposed on a first side of the housing and a second terminal disposed on the first side of the housing, wherein the first terminal is electrically isolated from the housing; and
an electrode stack positioned within the housing, the electrode stack comprising:
an anode current collector characterized by a first side facing the first side of the housing, a second side opposite the first side, and a third side extending between the first side and the second side, wherein the anode current collector defines an anode tab along the third side of the anode current collector, and wherein the anode tab is electrically coupled with the first terminal, and
a cathode current collector characterized by a first side facing the first side of the housing, a second side opposite the first side, and a third side extending between the first side and the second side, wherein the cathode current collector defines a cathode tab along the third side of the cathode current collector, and wherein the cathode tab is electrically coupled with the housing, wherein at least one of:
the cathode current collector defines a first and second series of cathode tabs distributed along the third side of the cathode current collector;
the first series of cathode tabs is closer to the first side of the housing than the second series of cathode tabs; and
a first spacing between each cathode tab of the first series of cathode tabs is greater than a second spacing between each cathode tab of the second series of cathode tabs.

19. The battery of claim 1, wherein
the cathode current collector defines each cathode tabs of the first and second series of cathode tabs to include a region of the cathode current collector free of active material.

20. The battery of claim 1, wherein each cathode tab of the first and second series of cathode tabs closer to the first side of the housing defines the first spacing greater than a second spacing defined between each cathode tab of the first and second series of cathode tabs farther from the first side of the housing.

* * * * *